United States Patent [19]

[11] 3,722,810

[45] Mar. 27, 1973

Kendall

[54] PRE-RECORDED MAGNETIC TAPE EDITING DEVICE

[75] Inventor: Trevor William Kendall, Long Island, N.Y.

[73] Assignee: Dictaphone Corporation, Bridgeport, Conn.

[22] Filed: Jan. 22, 1970

[21] Appl. No.: 4,858

[52] U.S. Cl.................242/56 R, 156/502, 242/58.1, 242/199

[51] Int. Cl.....B65h 19/26, B65h 19/28, B65h 21/00

[58] Field of Search...242/179, 56 R, 58.4, 198, 182, 242/58.1, 58.2, 58.3, 56 A; 156/502, 504, 505, 506

[56] References Cited

UNITED STATES PATENTS

| | | | |
|---|---|---|---|
| 3,227,594 | 1/1966 | Ryan | 242/58.4 X |
| 3,440,126 | 4/1969 | Bartholomay et al. | 242/58.4 X |
| 3,380,682 | 4/1968 | Georgantas et al. | 242/182 |
| 3,475,031 | 10/1969 | Kuehnlein | 242/198 UX |
| 3,495,782 | 2/1970 | Nelson et al. | 242/56 R |
| 3,495,783 | 2/1970 | Headington et al. | 242/58.4 |

*Primary Examiner*—George F. Mautz
*Attorney*—Arthur V. Smith and Curtis, Morris & Safford

[57] ABSTRACT

A tape editing device for use in splicing the lead end of a supply of magnetic tape on a supply reel to the free end of a leader tape on a takeup reel, which takeup reel is adapted to be rotated to draw tape from the supply reel after the splice is made. The editing device includes an enclosed buffer chamber having an open end positioned adjacent the path of travel of the magnetic tape as it is drawn from the supply reel and a splicing block, having a plurality of apertures therein, positioned in the path of travel of the magnetic tape between the buffer chamber and the takeup reel. A source of vacuum is operably connected to the buffer chamber and a magnetic pickup head control means is provided for selectively connecting the source of vacuum to the holes in the base of the splicing block in response to a prerecorded tone signal on the tape, whereby the portion of the tape passing over the splicing block, upon receipt of a tone signal by the magnetic head, is held immobile against the splicing block and excess tape, discharged from the supply reel as it is stopped, between the supply reel and the splicing block, is drawn into the buffer chamber through the open end thereof under the influence of said vacuum source.

10 Claims, 6 Drawing Figures

Patented March 27, 1973 3,722,810

4 Sheets-Sheet 1

PRE-RECORDED MAGNETIC TAPE EDITING DEVICE

BRIEF SUMMARY OF THE INVENTION

The present invention relates to magnetic tape editing devices and in particular to editing devices for placing prerecorded tape programs on cassette reels.

The principal object of this Editing Device is to provide a system whereby the magnetic tape will always be operated under minimum tension. This Editing Device ensures that there is absolutely no likehood of the magnetic tape being damaged during editing operation due to tension and stretching thereof.

Its further object is to provide an automatic positioning of the magnetic tape for the purpose of splicing by means of vacuum splicing block.

Its further object is to provide a receptable for the magnetic tape cassette whose position will be secure during the movement of the tape. It further provides a firm position for the tail end of the preleaded C-zero (i.e., the conventional "Phillips" type) cassette.

In accordance with an aspect of the invention, an Editing Device is provided which has a supply reel with programmed magnetic cassette tape wound thereon from which tape is taken past the mouth of a vacuum buffer chamber and then on to a vacuum splicing block. The tape runs from the supply reel in the vertical plane until it comes out of the vacuum buffer chamber. Then the tape is brought to a horizontal position through a smooth twist. This position is maintained in a groove formed in the vacuum splicing block. A leader tape end from the cassette in the receptacle is threaded properly and brought to the groove of the vacuum splicing block adjacent the end of the magnetic tape therein and a splice is made manually between the magnetic tape and the leader. In this position the tape is in close contact with the sensing head which is placed adjacent to the vacuum splicing block. The run button is momentarily depressed. The tape starts running from the supply reel past the vacuum buffer chamber, through the groove in the vacuum splicing block and over the sensing head to the cassette in the cassette receptable. The tape continues to run until a "Q" tone on the tape is detected by the sensing head. Once the Q tone is detected, a vacuum is applied to the splicing block. As a result, tape running in the groove of the splicing block is prevented from any further movement and is held securely in the groove for the purpose of splicing. That portion of the tape from the supply reel to the splicing block which has been taut till Q tone is detected, and thus resisted the tendency of the vacuum in the vacuum buffer chamber to draw it into the chamber, slackens now. The excess tape from the supply reel, which is not braked as hard as the take-up spool in the cassette therefore is sucked in the vacuum buffer chamber. Thus, there is absolutely no chance of damaging the tape. My invention of this vacuum buffer chamber dispenses with the dancing arm mechanisms heretofore used in tape splicing and editing devices.

When the Editing Device is stopped, the next operation is to cut through the tape in the slot provided in the vacuum splicing block; remove the cassette, place another cassette in the receptacle retaining the tail end of the cassette between the left front corner of the cassette and the receptacle. The take-up end is brought into the splicing block, butted with the tape just cut and the splice is made. The running operation is then repeated.

The above, and other objects, features and advantages of this invention, will be apparent in the following detailed description of an illustrative embodiment thereof which is to be read in connection with the accompanying drawings, wherein.

Figure 1:
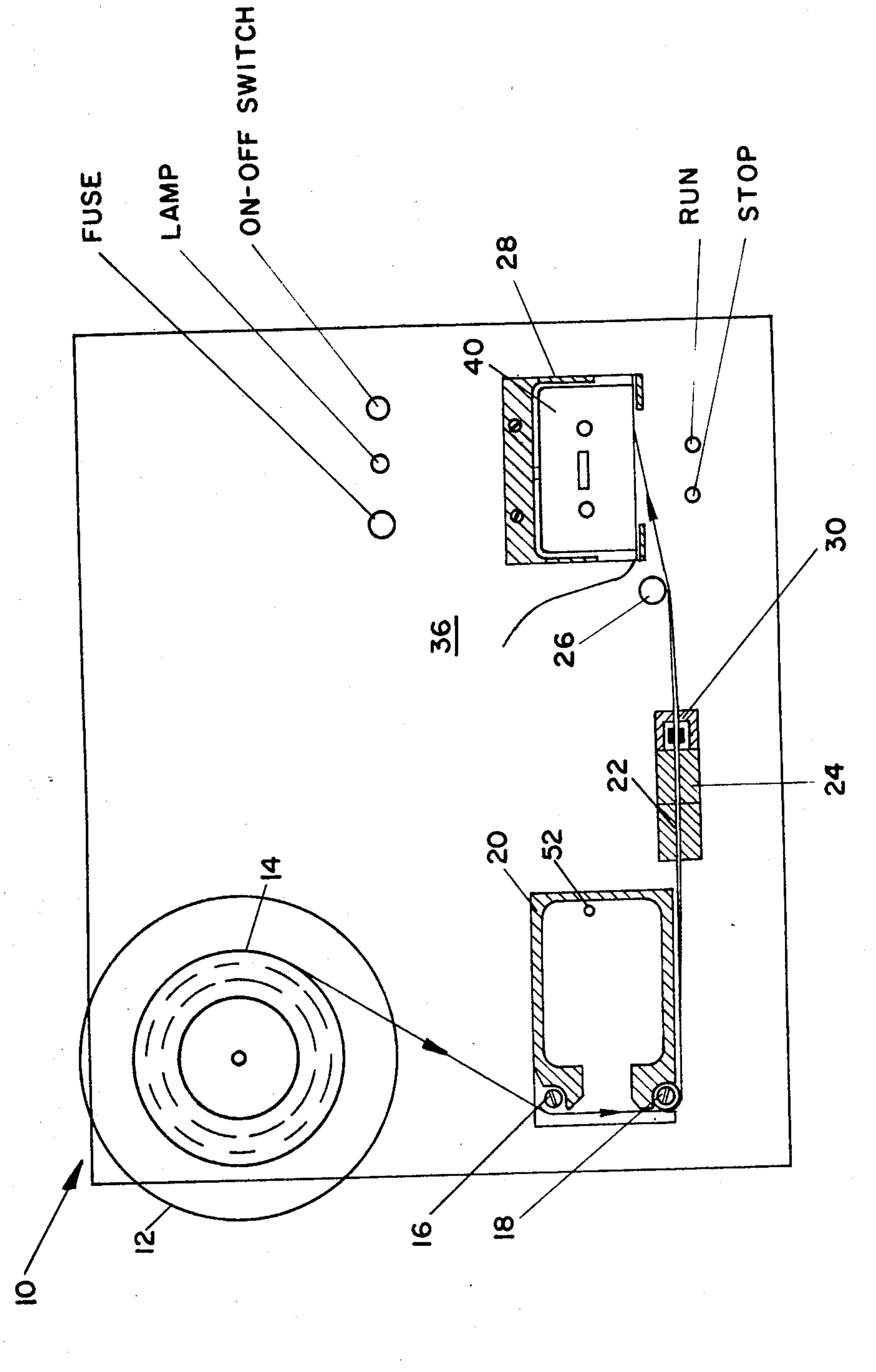
FIG. 1 is a top plan view, partly in section, of an Editing Device, constructed in accordance with an embodiment of the present invention.

Referring now to the drawings in detail, and initially to FIG. 1 thereof, it will be seen that a tape editing device 10, embodying the present invention, has a reel 12 thereon on which is wound a supply of prerecorded magnetic tape 14 on which a preselected program is repetitively recorded with a conventional "Q" tone between completed programs. The prerecorded tape 14 normally extends, during operation of the device, from reel 12 past precision engineered roller guides 16, 18, in a vacuum buffer chamber 20 as shown in FIG. 1. When the device 10 is in operation supply reel 12 rotates clock-wise, with the path of travel of tape 14 being from reel 12 to roller guide 16 to guide 18 and then from a left to right direction through a horizontal groove 22 formed in the vacuum splicing block 24. From the splicing block 24 the tape passes a stationary guide 26 to the cassette receptacle 28. The tape leaves guide 18 in a vertical plane and twists 90° to enter groove 22 in splicing block 24 in a horizontal plane. Undue twist or friction to the tape is avoided by proper positioning, alignment and precision engineering of the various components of the invention. As tape 14 leaves splicing block 24 it moves past a magnetic sensing head 30 and thereafter takes another 90° twist with the help of stationary guide 26 to enter cassette receptacle 28 in a vertical plane, (FIG. 1).

The groove 22 in block 24 is precision cut to conform to tape 14 and has a plurality of small holes 32 on its lower surface 34, which holes are connected to a vacuum pump (not shown) below the top panel 36 of device 10 through a switch or valve S which is energized, i.e. opened only when a Q tone is detected by sensing head 30, FIG. 2. A vertically extending slot 38 is provided in the splicing block to permit cutting or slicing of tape 14, (FIG. 1). The groove 22 in vacuum splicing block 24 is chamfered at both ends so that a minimum amount of friction is applied to the tape during its run. The sensing head 30 is positioned next to splicing block 22 and has its associated electronic circuitry located below the panel.

Figure 6:
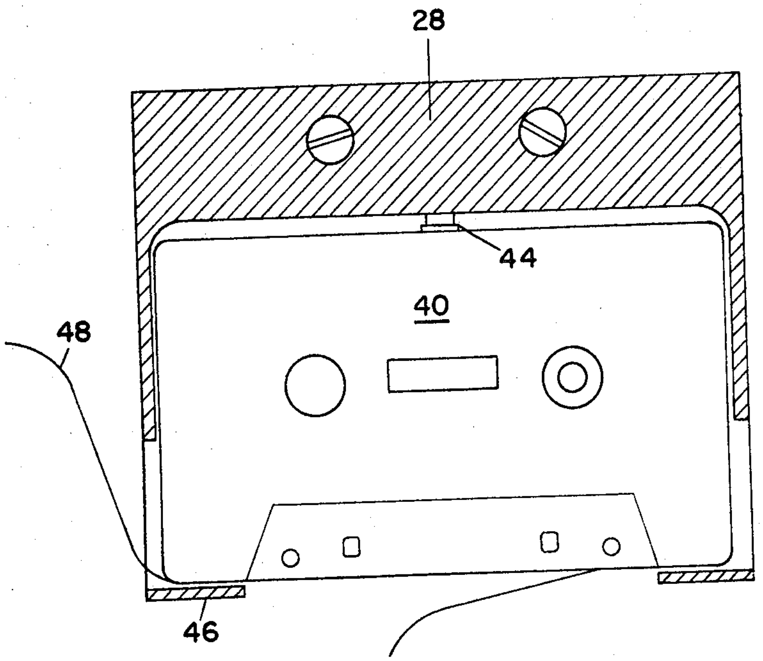
FIG. 6 is a view, similar to FIG. 5 of the cassette receptacle with the cassette therein.

The cassette receptacle 28 is mounted on panel 36 to receive cassette 40 and has a drive shaft 42 whose configuration generally matches that of the hub of the cassette, in order to drive that hub through a motor (not shown) to wind tape 14 thereon. The cassette 40 is held rigidly in position by a spring-loaded ball catch 44, which, as seen in FIG. 6, biases the cassette forwardly against the front end 46 of receptacle 28. The tail end of the cassette leader tape 48 is placed in between the left front corner of the cassette and the receptacle, as is also illustrated in FIG. 6. This arrangement permits the take-up reel in the cassette, which reel is engaged with shaft 42, to receive the programmed tape without any interference from the loose tail end.

Figure 2:
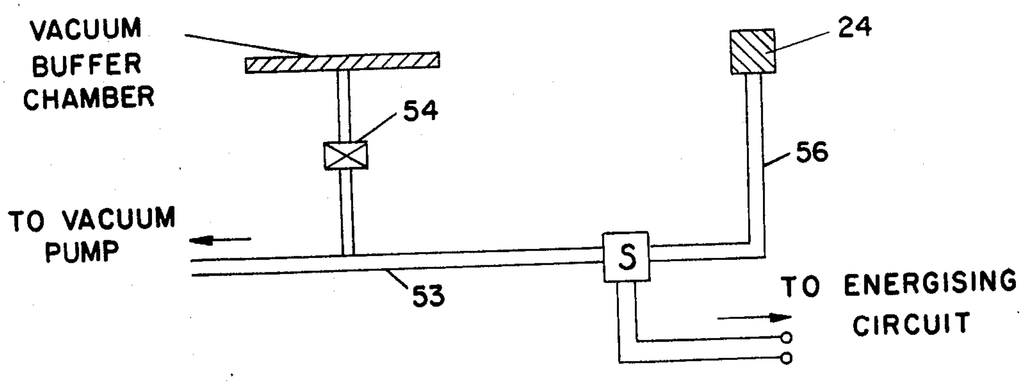
FIG. 2 is a block diagram of the set vacuum circuit utilized for the application of a vacuum to the vacuum buffer chamber and the vacuum splicing block.
Figure 3:
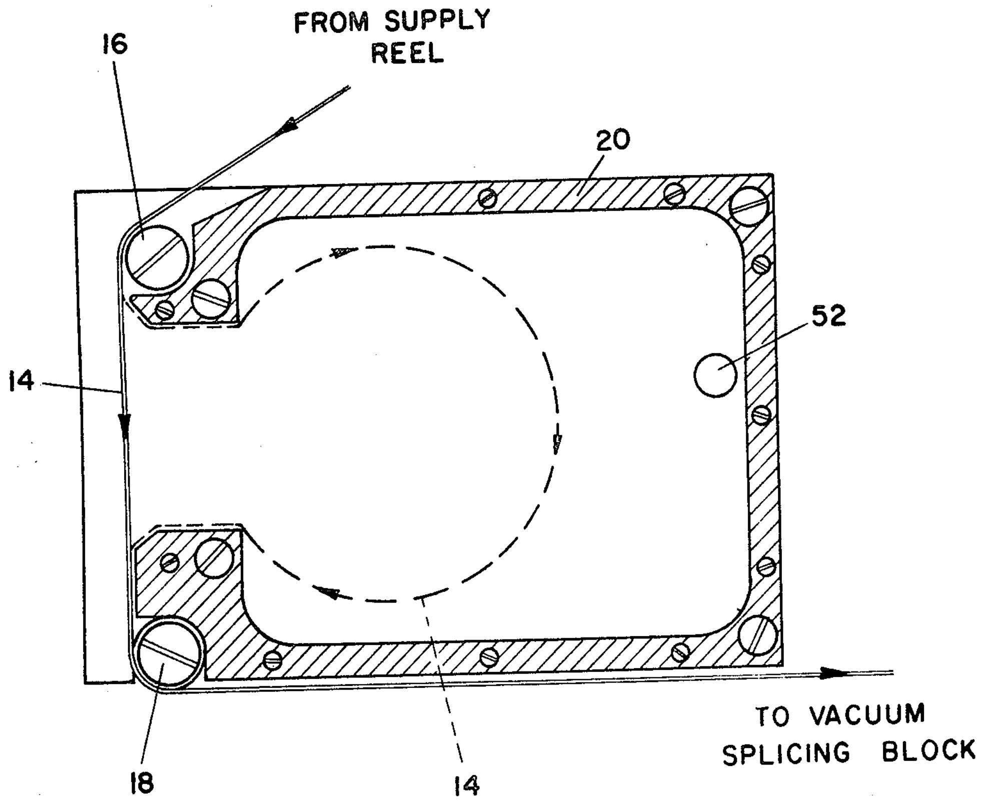
FIG. 3 is an enlarged top plan view of the vacuum buffer chamber illustrated in FIG. 1.
Figure 5:
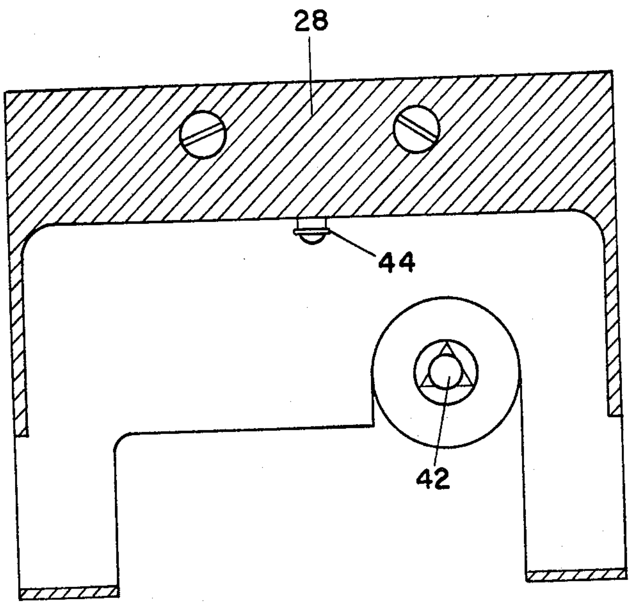
FIG. 5 is an enlarged top plan view of the cassette receptacle without the cassette.

The vacuum buffer chamber 20 shown in FIG. 3 has, on its, left side the two ball-bearing roller guides 16,18, placed one at the front side and the other at the back side thereof. The chamber 20 has a wide opening 50 at its left side, across which the tape 14 passes, under tension, during operation of the device. A hole 52 is drilled through panel 36 into the right side of chamber 20 and is continuously connected (FIG. 2) to the vacuum source (not shown) through line 53 and control valve 54. The chamber is closed on top by a plastic sheet (not shown). The taut position of the tape while running, as well as its slackened position when the tape is stopped and then sucked in the vacuum chamber are shown in FIG. 3 the latter being shown in dotted lines.

Figure 4:
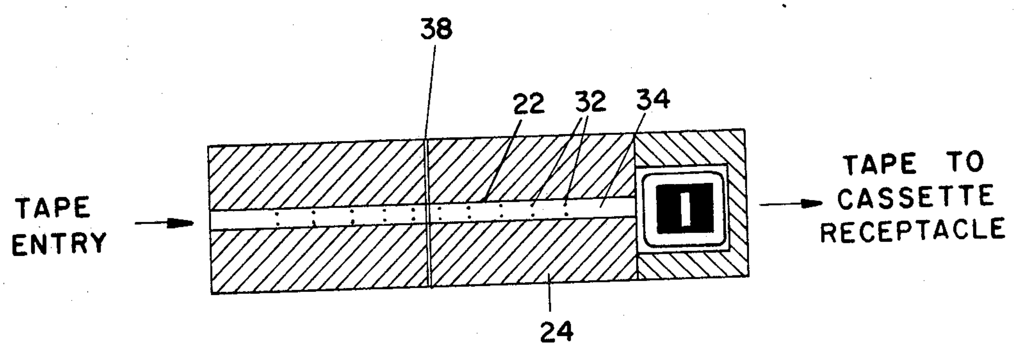
FIG. 4 is an enlarged top plan view of the vacuum splicing block and adjoining sensing-head.

As soon as a Q tone on tape 14 is detected by sensing head 30, the switch S in FIG. 2 is energized to open the vacuum line 56 so that vacuum is applied to splicing block 24. Thus, air is sucked in through the holes 32 in the splicing block (FIG. 4) and movement of the tape is brought to a halt instantaneously. Generally there is an ambiguity encountered about the position of Q tone on the tape in old devices. This is eliminated in this Editing Device, as that portion of the tape with the Q tone remains always on the right side of the splicing block. The tape which is in between supply reel 12 and splicing block 24 slackens at the time of stopping of the tape because of the inertia of supply reel 12 which causes some of the tape thereon to come off the reel as it is stopped. As a result the excess tape is drawn into the vacuum buffer chamber due to vacuum present therein and due to absence of tension on the tape. The form in which the excess tape gets accumulated in the vacuum buffer chamber is shown in FIG. 3 in dotted lines.

Although an illustrative embodiment of the present invention has been described herein with reference to the accompanying drawings, it is to be understood that the invention is not limited to that precise embodiment and that various changes and modifications may be effected therein by one skilled in the art without departing from the scope or spirit of this invention.

What is claimed is:

1. Apparatus for use in splicing the lead end of a supply of magnetic tape on a supply reel to the free end of a leader tape on a takeup reel which is adapted to be rotated to draw the tape from said supply reel after the splice is made, said apparatus comprising, an enclosed buffer chamber having an open end positioned adjacent the path of travel of tape drawn from said supply reel, a splicing surface, having a plurality of apertures therein, positioned in the path of travel of said tape between said buffer chamber and said takeup reel, a source of vacuum operably connected to said buffer chamber and means for selectively connecting said source of vacuum to said apertures in the splicing surface whereby the portion of the tape passing over said splicing surface, upon actuation of said means, is held immobile against said surface and excess tape between said supply reel and said splicing surface is drawn into said buffer chamber through said open end under the influence of said vacuum source.

2. Apparatus as defined in claim 1 wherein said splicing surface has a first groove therein extending substantially parallel to the path of travel of said tape and being substantially equal in width to said tape, said tape passing through said groove along its path of travel, and said apertures being formed in the base of said groove.

3. Apparatus as defined in claim 2 wherein said splicing surface has a second groove therein extending generally perpendicularly to said path of travel and being adapted to receive a knife edge for cutting tape held on the splicing surface by said vacuum source.

4. Apparatus as defined in claim 3 including means for continuously connecting said vacuum source to said buffer chamber and wherein said tape is under sufficient tension during operation of said takeup reel to pass across the open end in said buffer chamber and resist being drawn under the influence of said vacuum source during operation of said takeup reel.

5. Apparatus as defined in Claim 4 wherein said means includes a magnetic pickup head adapted to pickup a prerecorded tone signal on said tape.

6. Apparatus for use in splicing the lead end of a predetermined length of tape, as defined by prerecorded tone signals on a supply of tape on a supply reel, to the free end of a leader tape on a takeup reel in a cassette positioned on the apparatus and engaged with a driven shaft adapted to rotate the takeup reel and wind tape thereon from the supply reel, said apparatus comprising an enclosed buffer chamber having an open end positioned adjacent the path of travel of tape drawn from said supply reel, a splicing block positioned in the path of travel of said tape between said buffer chamber and said cassette and having a groove therein extending substantially parallel to the path of travel of said tape, said splicing block having a plurality of holes formed therein on the lower surface of said groove and said tape passing through said groove adjacent said holes, along its path of travel towards said cassette takeup reel, a source of vacuum operably connected to said buffer chamber and means, including a magnetic pickup head, for selectively connecting said source of vacuum to said holes in the base of said groove in response to said prerecorded tone signals on said tape, whereby the portion of the tape passing through said groove, upon receipt of a tone signal by said magnetic head, is held immobile against the base of said groove and excess tape discharged from said supply reel as it is stopped, between said supply reel and said splicing block, is drawn into said buffer chamber through said open end under the influence of said source of vacuum.

7. Apparatus as defined in claim 6 wherein said cassette has a second reel therein and a leader tape secured to said second reel and said apparatus includes a cassette receptacle adapted to receive said cassette with said takeup reel engaged with said driven shaft, said receptacle having an aperture therein adjacent one side of the cassette through which the free end of the leader tape on said second reel is positioned to hold said leader out of the path of travel of said tape.

8. Apparatus as defined in claim 7 including means for continuously connecting said vacuum source to said buffer chamber and wherein said tape is under sufficient tension during operation of the takeup reel to pass across the open end in said buffer chamber and resist being drawn therein under the influence of said vacuum source during operation of said takeup reel.

9. Apparatus as defined in claim 7 including a pair of roller guides positioned adjacent the open end of said buffer chamber to guide said tape under tension past the open end of said buffer chamber during operation of said takeup reel.

10. Apparatus as defined in claim 9 wherein said splicing surface has a second groove therein extending generally perpendicularly to said path of travel and being adapted to receive a knife edge for cutting tape held on the splicing surface by said vacuum source.

* * * * *